United States Patent
Yue et al.

(10) Patent No.: US 9,742,046 B2
(45) Date of Patent: Aug. 22, 2017

(54) HEATING SHEET FOR BATTERY MODULE AND BATTERY MODULE INCLUDING SAME

(71) Applicants: LG Hausys, Ltd., Seoul (KR); LG CHEM, LTD., Seoul (KR)

(72) Inventors: Seong Hoon Yue, Seongnam-si (KR); Jong Hun Lee, Seongnam-si (KR); Yea Ri Song, Seoul (KR); Chang Hak Shin, Seoul (KR); Ku Il Park, Yongin-si (KR); Deok Ryul Hwang, Seoul (KR); Hwan Seok Park, Anyang-si (KR)

(73) Assignees: LG HAUSYS, LTD., Seoul (KR); LG CHEM, LTD., Seoul (KR)

( * ) Notice: Subject to any disclaimer, the term of this patent is extended or adjusted under 35 U.S.C. 154(b) by 0 days.

(21) Appl. No.: 14/652,638

(22) PCT Filed: Aug. 26, 2013

(86) PCT No.: PCT/KR2013/007635
§ 371 (c)(1),
(2) Date: Jun. 16, 2015

(87) PCT Pub. No.: WO2014/098348
PCT Pub. Date: Jun. 26, 2014

(65) Prior Publication Data
US 2015/0325892 A1    Nov. 12, 2015

(30) Foreign Application Priority Data
Dec. 21, 2012 (KR) .................. 10-2012-0151062

(51) Int. Cl.
*H01M 10/655* (2014.01)
*H01M 10/615* (2014.01)
(Continued)

(52) U.S. Cl.
CPC ....... *H01M 10/655* (2015.04); *H01M 10/615* (2015.04); *H01M 10/625* (2015.04);
(Continued)

(58) Field of Classification Search
CPC combination set(s) only.
See application file for complete search history.

(56) References Cited

U.S. PATENT DOCUMENTS 5,198,638 A * 3/1993 Massacesi ............... B60R 16/04
219/209
5,948,298 A    9/1999 Ijaz
(Continued)

FOREIGN PATENT DOCUMENTS

DE    102011104000 A1   12/2012
KR       10-0659499 B1   12/2006
(Continued)

OTHER PUBLICATIONS

European Extended Search Report corresponding to Application No. 13864336.6 issued on Oct. 13, 2015.
(Continued)

*Primary Examiner* — Imran Akram
(74) *Attorney, Agent, or Firm* — Hauptman Ham, LLP (57) ABSTRACT

Provided is a heating sheet for a battery module, including: a surface heating element; an insulating layer on one surface of the surface heating element; and an insulating adhesive layer on the other surface of the surface heating element, in which the area of the heating portion of the surface heating element is 40% to 90% of the entire area of the battery cell to which the surface heating element is attached. Also provided is a battery module including the heating sheet for a battery module and the battery cell, in which the area of the heated portion of the battery cell is 40% to 90% of the entire area of the battery cell.

14 Claims, 7 Drawing Sheets

(51) Int. Cl.
*H01M 10/6571* (2014.01)
*H01M 10/625* (2014.01)
*H05B 3/20* (2006.01)

(52) U.S. Cl.
CPC .......... *H01M 10/6571* (2015.04); *H05B 3/20* (2013.01); *H01M 2220/20* (2013.01); *H05B 2203/013* (2013.01); *H05B 2214/04* (2013.01)

(56) References Cited

U.S. PATENT DOCUMENTS

| | | | | |
|---|---|---|---|---|
| 9,237,606 | B2* | 1/2016 | Yue | H05B 3/34 |
| 2007/0254137 | A1 | 11/2007 | Koppe et al. | |
| 2011/0212356 | A1* | 9/2011 | Tennessen | F28F 1/022 |
| | | | | 429/120 |
| 2012/0107665 | A1 | 5/2012 | Abe et al. | |
| 2012/0219839 | A1* | 8/2012 | Kritzer | H01M 2/10 |
| | | | | 429/120 |
| 2013/0236753 | A1* | 9/2013 | Yue | H01M 2/1077 |
| | | | | 429/62 |
| 2013/0307483 | A1* | 11/2013 | Yoshida | H01M 10/425 |
| | | | | 320/127 |
| 2013/0344369 | A1* | 12/2013 | Miyakawa | H01M 2/1077 |
| | | | | 429/120 |

FOREIGN PATENT DOCUMENTS

| | | |
|---|---|---|
| KR | 20090102253 A | 9/2009 |
| KR | 20100113996 A | 10/2010 |
| KR | 20120053476 A | 5/2012 |
| WO | 2012067432 A2 | 5/2012 |
| WO | 2012105636 A1 | 8/2012 |

OTHER PUBLICATIONS

International Search Report for PCT/KR2013/007635 mailed on Dec. 5, 2013.
Korean Notice of Allowance dated Sep. 23, 2016 in connection with the counterpart Korean Patent Application No. 10-2012-0151062.

* cited by examiner

HEATING SHEET FOR BATTERY MODULE AND BATTERY MODULE INCLUDING SAME

CROSS REFERENCE TO RELATED APPLICATION

This application claims the priority of Korea Patent Application No. 10-2012-0151062 filed on Dec. 21, 2012 in the KIPO (Korean Intellectual Property Office). Further, this application is the National Phase application of International Application No. PCT/KR2013/007635 filed on Aug. 26, 2013, which designates the United States and was published in Japanese.

TECHNICAL FIELD

The present invention relates to a heating sheet for battery modules and a battery module including the same.

BACKGROUND ART

In winter, a battery used in photovoltaic power generators and electric vehicles is decreased in efficiency of discharge due to low temperature. For example, discharge efficiency of the battery is decreased about 50% when an external temperature is decreased below about −20° C. In addition, since mobility of ions in an electrolyte of the battery is decreased at an ambient temperature of about −10° C. or less, electric current becomes weak and output of the battery drops. In particular, when a fully charged electric vehicle (EV) is parked outside, the electrolyte is hardened due to the external temperature, thereby causing a problem in long term lifespan of the battery. Therefore, it is necessary to maintain the temperature of the battery even in winter so as to maintain lifespan and efficiency of the battery.

As a method of heating a battery, a thermoelectric element or a positive temperature coefficient (PTC) heater is used to heat air. However, various studies have been made to develop a more effective and efficient method of directly heating a battery.

DISCLOSURE

Technical Problem

It is an aspect of the present invention to provide a heating sheet for battery modules, which can uniformly and effectively heat battery cells through a minimum area of a heating portion It is another aspect of the present invention to provide a battery module which includes the heating sheet as set forth above and a battery cell.

Technical Solution

In accordance with one aspect of the present invention, a heating sheet for battery modules includes: a surface heating element; an insulating layer formed on one surface of the surface heating element; and an insulating adhesive layer formed on the other surface of the surface heating element, wherein an area of a heating portion of the surface heating element is about 40% to about 90% of an entire area of a battery cell to which the surface heating element is attached.

The area of the heating portion of the surface heating element may include an area, a temperature of which is about 30° C. to about 50° C. higher than an initial temperature of the surface heating element.

The surface heating element may generate heat only in the area of the heating portion of the surface heating element.

The surface heating element may have a heating temperature of about 20° C. to about 80° C.

The surface heating element may include a base film, a heating layer, and an electrode layer.

The heating layer may include at least one selected from the group consisting of carbon nanotubes, carbon black, graphene, graphite, and combinations thereof.

The heating layer may have a thickness of about 2 μm to about 10 μm.

The insulating adhesive layer may have a thickness of about 25 μm to about 75 μm.

The insulating layer may have a thickness of about 50 μm to about 100 μm.

In accordance with another aspect of the present invention, a battery module may include: the heating sheet for battery modules and a battery cell, wherein an area of a heated portion of the battery cell is about 40% to about 90% of the entire area of the battery cell.

The area of the heated portion of the battery cell may include an area, a temperature of which is about 30° C. to about 50° C. higher than an initial temperature of the battery cell.

The heating sheet for battery modules may increase a temperature of an electrolyte within the battery cell by about 20° C. or higher within 200 seconds from a start of heating.

The battery cell may have a surface temperature of about 20° C. to about 80° C.

The electrolyte within the battery cell may have a temperature of about −10° C. to about 35° C.

Advantageous Effects

According to embodiments of the present invention, a heating sheet for battery modules is attached to a surface of a battery cell, whereby the battery can be directly heated by heat from the heating sheet, thereby improving output of the battery module to a predetermined level in winter.

The heating sheet for battery modules can effectively increase the temperature of the battery cell in a short period of time in winter, thereby extending lifespan of the battery.

BEST MODE

Hereinafter, embodiments of the present invention will be described in detail with reference to the accompanying drawings. However, it should be understood that the following embodiments are provided for illustration only and do not limit the scope of the present invention, as defined only by the appended claims and equivalents thereof.

Heating Sheet for Battery Module

According to one embodiment of the present invention, a heating sheet for battery modules includes a surface heating element; an insulating layer formed on one surface of the surface heating element; and an insulating adhesive layer formed on the other surface of the surface heating element, in which an area of a heating portion of the surface heating element is about 40% to 90% of the entire area of the battery cell to which the surface heating element is attached.

With recent market expansion of electric vehicles, demand for lithium-ion battery having high energy intensity has been increased. However, output characteristics of the lithium-ion battery are poor at low temperature and thus an electric vehicle can be stopped due to large voltage drop in winter. To solve this problem, a heater or a positive temperature coefficient (PTC) heater used in a diesel vehicle is attached to a coolant for cooling. In this case, a medium such as the coolant is primarily heated by the heater and the like, and then the battery is heated by the medium, thereby reducing heat transfer efficiency.

Thus, the heating sheet includes the surface heating element configured to directly heat a target heating element instead of indirectly heating the medium, thereby improving heat transfer efficiency. Specifically, the heating sheet is directly attached to and directly heats the surface of the battery cell, thereby increasing output of the battery to a predetermined level or higher in winter.

Figure 1:
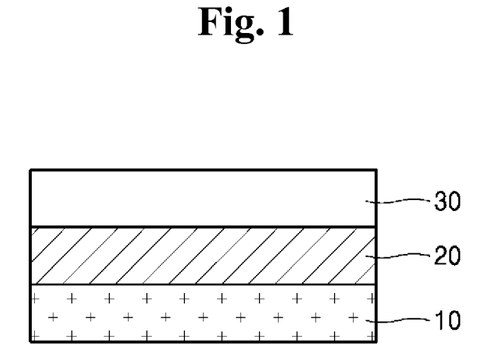
FIG. 1 is a schematic side-sectional view of a heating sheet for battery modules according to one embodiment of the present invention.

FIG. 1 is a schematic side-sectional view of a heating sheet for battery modules according to one embodiment of the present invention, in which the heating sheet includes an insulating layer 30, a surface heating element 20, and an insulating adhesive layer 10. An area of a heating portion of the surface heating element may be about 40% to about 90% of an entire area of a battery cell to which the surface heating element is attached.

As used herein, the area of the heating portion refers to an area of the surface heating element which generates heat by a heating layer of the surface heating element when voltage is applied to an electrode layer of the surface heating element. Thus, the area of the heating portion may be a local portion of the entire area of the battery cell to which the surface heating element is attached. For example, heat may be generated from an area of the surface heating element corresponding to about 40% to about 90% of the entire area of the battery cell to which the surface heating element is attached.

If the area of the heating portion of the surface heating element is less than about 40% the entire area of the battery cell to which the surface heating element is attached, an electrolyte within the battery is not heated to −10° C. or higher within about 200 seconds and it is thus impossible to secure the output of the battery. Further, deviation in temperature occurs between a heated region and an unheated region of the electrolyte within the battery, thereby causing reduction in lifespan of the battery.

In addition, if the area of the heating portion is larger than about 90% of the entire area of the battery cell to which the surface heating element is attached, it is possible to increase the temperature of the electrolyte within the battery in a shorter period of time, but the battery can be damaged since the temperature increases up to 35° C. or higher after about 200 seconds and electric power can be wastefully consumed since the periphery of the battery is heated.

Accordingly, the area of the heating portion of the surface heating element is maintained to be about 40% to about 90%, specifically about 50% to about 80% of the entire area of the battery cell to which the surface heating element is attached, thereby efficiently increasing the temperature of the electrolyte within the battery to allow the battery to achieve 85% output within 200 seconds.

The area of the heating portion of the surface heating element may include an area, a temperature of which is about 30° C. to about 50° C. higher than an initial temperature of the surface heating element. Assuming that a global average temperature in winter is about −30° C. to about −10° C., the increased temperature on the area of the heating portion of the surface heating element refers to an increased temperature of the surface heating element attached to the surface of the battery, in which difference in temperature between the center and a periphery on the area of the heating portion can range from about 5° C. to about 10° C.

The area of the heating portion of the surface heating element refers to an area where the surface heating element after heating is about 30° C. to about 50° C. higher than the initial temperature of the surface heating element before heating, when a constant voltage is applied to the electrode layer of the surface heating element. If the temperature of the surface heating element after heating does not increase to this temperature range, an electric vehicle is likely to stall since mobility of lithium ions in the electrolyte is decreased and the output of electric current is not constant. On the other hand, when the temperature of the surface heating element increases to this temperature range higher than the initial temperature of the surface heating element, operation of the electric vehicle can become stable and the battery can have improved life cycle.

The area of the heating portion of the surface heating element may extend from the center to the periphery of the entire area of the battery cell to which the surface heating element is attached. The center of the entire area of the battery cell to which the surface heating element is attached refers to a portion where horizontal and vertical halves of a rectangular-plate shaped surface heating element intersect. Heat is first generated at the center to secure a certain area of the heating portion and is transferred from the center to the periphery of the surface heating element, whereby the area of the heating portion of the surface heating element can also extend.

The area of the heating portion of the surface heating element may be formed by applying a voltage of 24 V or less to the electrode layer of the surface heating element. As described above, the area of the heating portion refers to an area of the surface heating element where heat is generated by the heating layer of the surface heating element when voltage is applied to the electrode layer of the surface heating element. Here, the voltage applied to the electrode layer of the surface heating element may be less than or equal to about 24 V. If a voltage higher than about 24 V is applied to the electrode layer, it is possible to maintain a desired level of the area of the heating portion in a shorter period of time, but the heating sheet including the surface heating element and a battery using the same can be damaged.

The surface heating element may generate heat only in the area of the heating portion of the surface heating element. For example, when the voltage less than or equal to 24 V is applied to the electrode layer of the surface heating element, the area of the heating portion of the surface heating element may be about 40% to about 90% of the entire area of the battery cell to which the surface heating element is attached, and only the area of the heating portion of the surface heating element may be sufficient to control a total amount of heat generated by the surface heating element. The amount of generated heat refers to an amount of heat generated when electric current flows in a wire. Here, the amount of generated heat refers to an amount of heat generated from the surface heating element when electric current flows corresponding to a voltage of 24 V or less.

Specifically, when a voltage of 24 V or less is applied to the electrode layer of the surface heating element, the amount of heat generated from the surface heating element may range from about 37.5 W to about 150 W. Since the amount of heat generated from the surface heating element is secured as above, it is possible to achieve 100% driving efficiency of a battery within a short period of time, i.e. about 2 minutes. For example, the driving efficiency of the battery of the electric vehicle, which is discharged during driving of the electric vehicle and is charged during control of the electric vehicle, can be increased to 100% by the amount of heat generated from the surface heating element.

Further, the area of the heating portion of the surface heating element included in the heating sheet for battery modules is maintained at about 40% to about 90% of the entire area of the battery cell to which the surface heating element is attached, whereby the heating temperature of the surface heating element can range from about 20° C. to about 80° C., specifically from about 40° C. to about 60° C. The heating temperature of the surface heating element refers to a temperature of heating the battery cell to be attached to the insulating adhesive layer, which may directly affect the surface temperature of the battery cell to be adhered by the heating temperature of the surface heating element, i.e., the temperature of the electrolyte within the battery cell, and properly control the heating temperature according to the area of the heating portion of the surface heating element, i.e. the heating temperature of the battery cell.

The surface temperature of the surface heating element is secured at about 20° C. to about 80° C., and it is thus possible to achieve 100% charging and discharging efficiency of the battery. More specifically, the output of the battery must be about 85% or more in order to operate the battery of the electric vehicle in winter. To this end, the electrolyte within the battery has a temperature of about −10° C. to about 35° C. Thus, when the surface temperature of the surface heating element is secured at about 20° C. to about 80° C., the battery of the electric vehicle can operate in winter.

Figure 2:
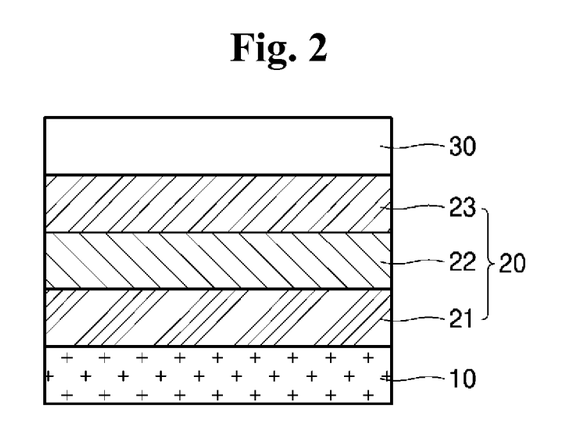
FIG. 2 is a schematic side-sectional view of a heating sheet for battery modules, which includes a surface heating element, according to another embodiment of the present invention.
Figure 3:
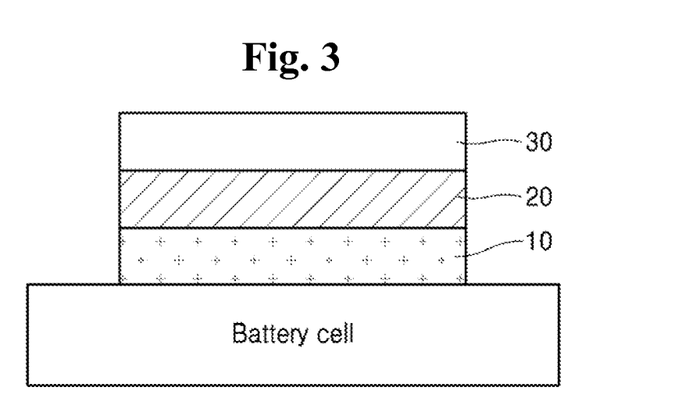
FIG. 3 is a schematic side-sectional view of a battery module according to a further embodiment of the present invention.

FIG. 2 is a schematic side-sectional view of a heating sheet for battery modules, which includes a surface heating element, according to another embodiment of the present invention, in which the surface heating element 20 may have a structure wherein a base film 21, a heating layer 22 and an electrode layer 23 are stacked in order.

The base film 21 may include at least one selected from the group consisting of biaxially-oriented polyethylene terephthalate (BOPET), both sides of which are treated with a primer, polyimide (PI), oriented polystyrene (OPS), oriented polypropylene (OPP), polyethyleneimine (PEI), polyphenylene sulfide (PPS), polyethylene naphthalate (PEN), poly(ether sulfones) (PES) and combination thereof, and has insulating properties.

The base film 21 may have a thickness of about 10 µm to about 100 µm. Within this thickness range of the base film, the heating layer to be stacked on the base film can maintain smoothness of the film layer due to lack of thermal stability during a drying process after printing, thereby securing efficiency of heat transfer from the heating layer to a heat transfer layer.

The heating layer 22 includes at least one selected from the group consisting of carbon nanotubes (CNT), carbon black, graphene, graphite, and combinations thereof. Specifically, the heating layer 22 may include a heating layer woven with carbon fibers, a heating layer formed by impregnating non-woven fabrics with CNT or graphene, a heating layer formed by impregnating non-woven fabrics with conductive carbon, or a heating layer formed by coating CNT or graphene paste or ink onto a base film. For coating, gravure coating may be performed.

The heating layer 22 may have a thickness of about 2 µm to about 10 µm. Within this thickness range of the heating layer, the heating layer can have uniform thickness and easily function as a heating element due to low resistance when voltage is applied to the electrode layer. Further, this thickness range of the heating layer can improves adhesion to a base material to prevent cracking through, and facilitates mass production through simple manufacture thereof by printing with a rotary screen.

The electrode layer 23 may adjust resistance of end products based on a space between electrodes. At this time, the space between the electrodes may range from about 4 mm to about 16 mm. Within this range of the space between the electrodes, the electrode layer can be prevented from becoming like a wire heater and from acting as a line heating element instead of a surface heating element, and it is also possible to decrease a possibility of explosion of the battery cell due to heat intensively supplied to the surface of the battery cell. In addition, this space between the electrodes allows uniform increase of the surface temperature of the battery cell, thereby reducing danger of explosion of the battery cell.

The electrode layer 23 may be formed in a certain pattern on the heating layer 22 through screen printing. The electrode layer 23 may include Ag, Cu, and the like.

The insulating layer 30 is formed on one surface of the surface heating element 20 and may be provided in the form of a thin film. The insulating layer may include a nonconductor which prevents heat generated from the surface heating element from escaping and does not carry electricity or heat. The insulating layer 30 may include a film made of one selected from among biaxially-oriented polyethylene terephthalate (BOPET), oriented polystyrene (OPS), oriented polypropylene (OPP), polyether ether ketone (PEEK), polyethylene terephthalate glycol (PETG), and polyethyleneimide (PEI).

Specifically, the insulating layer may have a thickness of about 50 µm to about 100 µm. Within this thickness range of the insulating layer, there is no crease even after the surface heating element including the heating layer is printed, and specifically, it is possible to provide a heating sheet that can withstand a voltage of about 10 kV without dielectric breakdown.

The insulating adhesive layer 10 is formed on the other surface of the surface heating element 20 on which the insulating layer 30 is not formed, and serves not only to maintain adhesion to the battery to which the insulating adhesive layer will be attached later, but also to transfer heat from the surface heating element 20 to the battery. The insulating adhesive layer 10 may be formed using an acrylic compound, a silicon compound, or an ethylene vinylacetate (EVA) compound.

The acrylic compound may include an acrylic compound, an acrylic polymer, an acrylic copolymer, and the like, and may include, for example, (meth)acrylates, bisacrylates, polymers thereof, and copolymers thereof, without being limited thereto. Any acrylic compound having insulating and adhesive properties may be used without limitation.

The silicon compound may include a poly dimethyl siloxane compound, without being limited thereto. Any silicon compound having insulating and adhesive properties may be used without limitation. In addition, there is no specific limit to the EVA compound, and it will be appreciated by those skilled in the art that any EVA compound having insulating and adhesive properties can be employed without limitation.

The insulating adhesive layer 10 may have a thickness of about 25 μm to about 75 μm. Within this thickness range, the insulating adhesive layer 10 can secure an adhesive strength of about 1 Kgf/cm$^2$ or more, thereby facilitating maintenance of higher adhesive strength than a predetermined level and providing an effect on resistance to water permeability through a lateral side of the insulating adhesive layer. Specifically, if the thickness of the insulating adhesive layer 10 is above the foregoing range, heat generated from the heating layer 22 of the surface heating element 20 is transferred slowly, and it is thus impossible to increase the temperature on the surface of the battery cell to be attached to the insulating adhesive layer in a short period of time.

Battery Module

According to another embodiment of the present invention, a battery module includes a heating sheet and a battery cell, in which the heating sheet includes a surface heating element; an insulating layer formed on one surface of the surface heating element; and an insulating adhesive layer formed on the other surface of the surface heating element, and an area of the heating portion of the surface heating element is 40% to 90% of the entire area of the battery cell to which the surface heating element is attached, that is, an area of a heated portion of the battery cell ranges from 40% to 90% of the entire area of the battery cell.

The battery cell includes any battery cell well-known in the art and there is no limit to its structure. Specifically, the battery cell is used for photovoltaic power generation and an electric vehicle. More specifically, the battery cell may be used as a battery cell for an electric vehicle.

As mentioned above, the area of the heating portion of the surface heating element included in the heating sheet may range from about 40% to about 90% of the entire area of the battery cell to which the surface heating element is attached. A target heating element in direct contact with the surface heating element and directly heated together with the surface heating element may be the battery cell, in which the area of the heated portion of the battery cell may also range from about 40% to about 90% of the entire area of the battery cell.

The area of the heated portion of the battery cell may include an area, a temperature of which is about 30° C. to about 50° C. higher than an initial temperature of the battery cell. The area of the heated portion of the battery cell may be formed by the area of the heating portion of the surface heating element, and refers to an area where the temperature of the heated portion of the battery cell is by about 30° C. to about 50° C. higher than initial temperature before heating the battery cell. After heat is generated from the surface heating element, the temperature of the heated battery cell is increased within a predetermined range, thereby achieving a battery charging and discharging efficiency of 100%.

Specifically, the heating sheet for battery modules can increase the temperature of an electrolyte within the battery cell by about 20° C. or higher within about 200 seconds from a start of heating based on the heating temperature of the surface heating element, i.e. the heating temperature applied to the battery cell. If the area of the heated portion of the battery cell heated by the heat of the surface heating element is greater than about 90% of the entire area of the battery cell, it is possible to increase the surface temperature of the battery cell by about 20° C. in a short period of time, but electric power can be wastefully consumed since the periphery of the battery can be heated.

If the area of the heated portion of the battery cell is less than about 40% the entire area of the battery cell, the surface temperature of the battery cell is increased by less than about 20° C. and it is thus difficult to secure desired output of the battery, thereby making it difficult to drive the battery in winter. Therefore, the area of the heated portion within the above range can provide a battery module having improved economic efficiency.

As described above, since the heating temperature of the surface heating element ranges from about 20° C. to about 80° C., the surface temperature of the battery cell directly affected and heated by the heating temperature of the surface heating element may range from about 20° C. to about 80° C. Specifically, the temperature of the electrolyte within the battery cell may range from about −10° C. to about 35° C.

By maintaining the surface temperature of the battery cell within the foregoing range, it is possible to increase the temperature of the electrolyte within the battery cell, and the increased temperature of the electrolyte allows the battery to achieve at least 85% output in winter.

Next, the present invention will be described in detail with reference to examples. However, it should be understood that the following examples are provided for illustration only and are not to be construed in any way as limiting the present invention.

EXAMPLE

A 100 μm thick base film of BOPET, both sides of which were treated with a primer, was coated with a 5 μm thick CNT paste layer. An electrode layer of Ag was screen-printed thereon such that the base films coated with CNT pastes can be connected by an electrode, thereby preparing a surface heating element. Then, an aluminum thin film (i.e. foil) was stacked on one surface of the surface heating element, and an acrylic adhesive was applied to a thickness of 25 μm to the other surface of the surface heating element, thereby preparing a heating sheet. The heating sheet was attached to a battery cell via adhesives, thereby preparing a battery module for electric vehicles.

<Experimental Example>—Correlation Analysis of Time Vs. Area of Heating Portion Vs. Surface Temperature FIG. 4 shows a range of an area of a heating portion, which can increase the temperature of an electrolyte within the battery cell to −10° C. or higher within 100 seconds, 120 seconds, 150 seconds, 180 seconds, and 200 seconds from a start of heating, and can secure 40° C. as a heating temperature of the surface heating element or a heating temperature applied to the battery cell by heat generated from the surface heating element, when a voltage of 24 V was applied to the electrode layer of the surface heating element.

Figure 4:
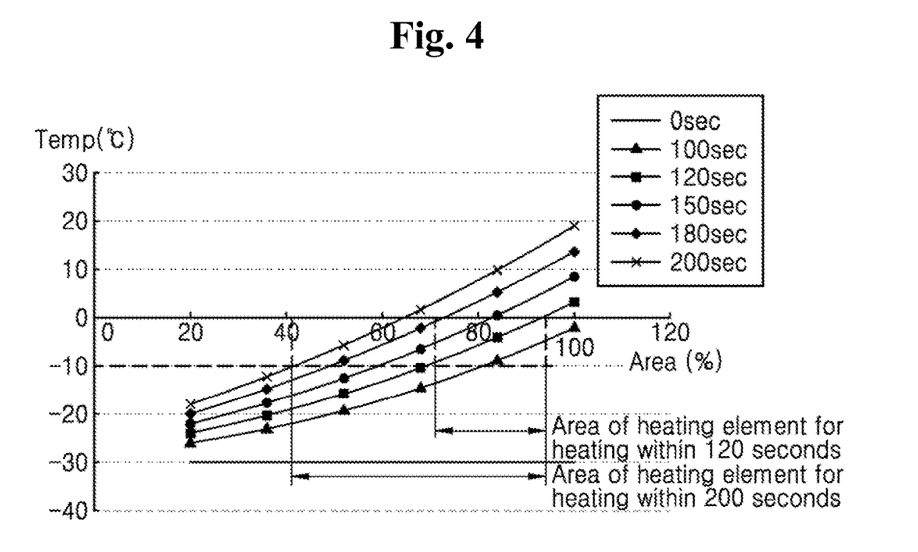
FIG. 4 is a graph depicting correlation of time vs. area of heating portion vs. surface temperature.

Specifically, in FIG. 4, it can be seen that, when the heating temperature of the surface heating element included in the heating sheet, i.e. the heating temperature applied to the battery cell by heat generated from the surface heating element, is 40° C., the area of the heating portion of the surface heating element and the area of the heated portion of the battery cell range from 40% to 90% in order to allow the electrolyte within the battery cell to reach a temperature of −10° C. or higher within 200 seconds. More specifically, it is desirable that the area of the heating portion of the surface heating element and the area of the heated portion of the battery cell be enlarged by about 70% to about 90% within 120 seconds, which is a reasonable time to delay driving after starting an engine.

Figure 5:
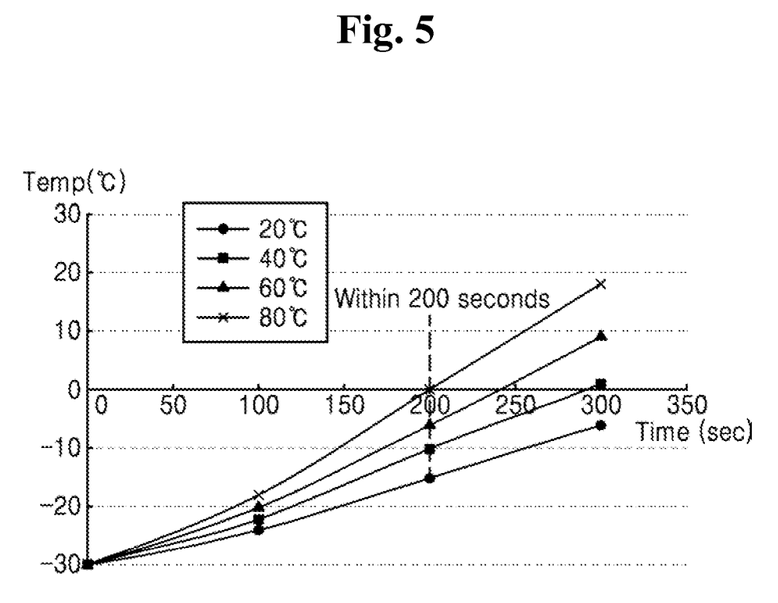
FIG. 5 to FIG. 7 are graphs depicting temperatures of electrolytes within the battery cell, which increase within 200 seconds from a start of heating by the surface heating element having heating temperatures of 20° C., 40° C., 60° C. and 80° C. when the area of the heating portion of the surface heating element and the area of the heated portion of the battery cell are 40%, 70% and 90%.
Figure 6:
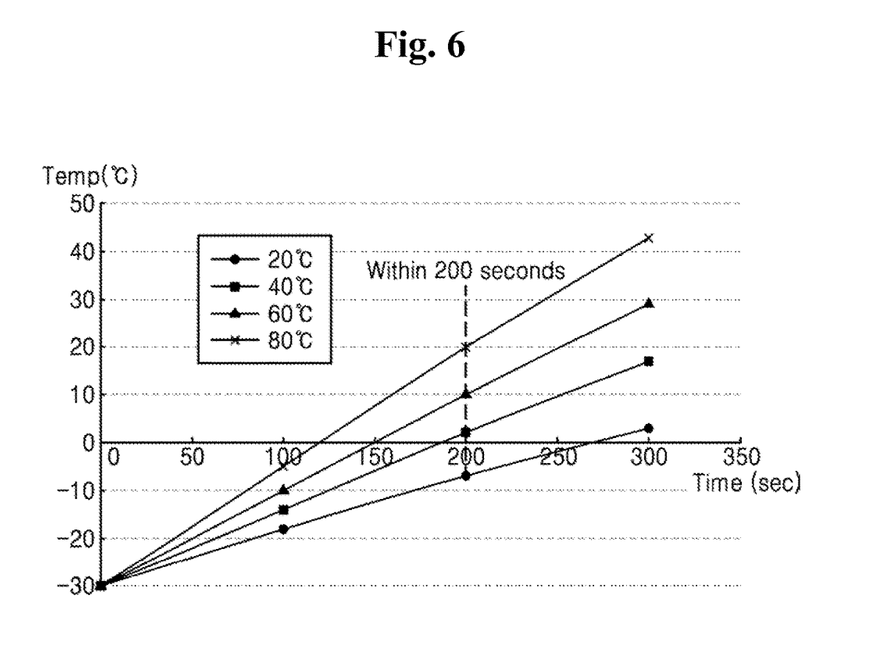
Figure 7:
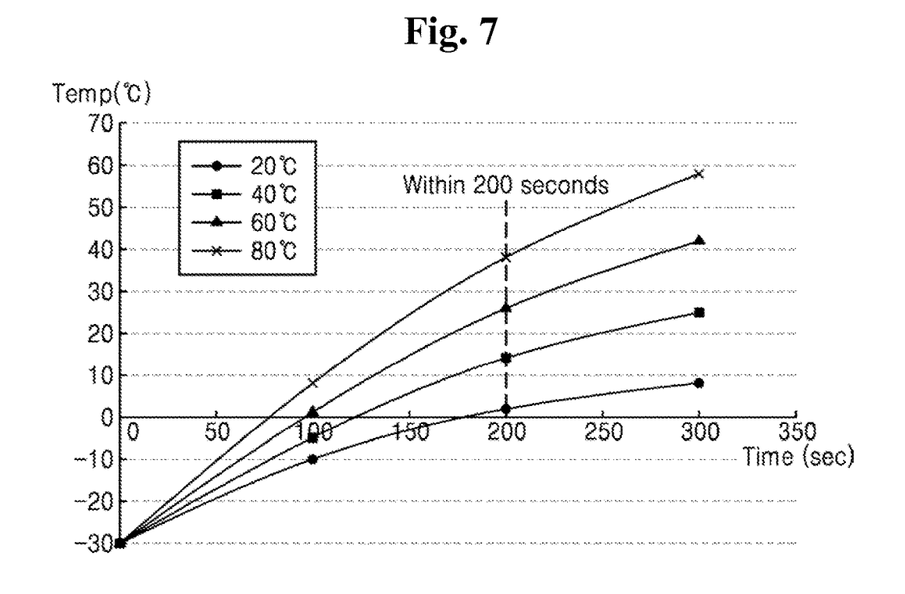

FIG. 5 to FIG. 7 are graphs depicting temperatures of electrolytes within the battery cell, which increase within 200 seconds from a start of heating by the surface heating element having heating temperatures of 20° C., 40° C., 60° C. and 80° C. when the area of the heating portion of the surface heating element and the area of the heated portion of the battery cell are 40%, 70% and 90%.

Referring to FIG. 5, when the area of the heating portion of the surface heating element and the area of the heated portion of the battery cell are 40%, the heating temperature of the surface heating element, i.e. the temperature applied to the battery cell, is 40° C. or higher in order to allow the electrolyte within the battery cell to have a temperature of −10° C. or higher within 200 seconds.

Referring to FIG. 6, when the area of the heating portion of the surface heating element and the area of the heated portion of the battery cell are 70%, the heating temperature of the surface heating element, i.e. the temperature applied to the battery cell, is 20° C. or higher in order to allow the electrolyte within the battery cell to have a temperature of −10° C. or higher within 200 seconds.

Referring to FIG. 7, when the area of the heating portion of the surface heating element and the area of the heated portion of the battery cell are 90%, the temperature of the electrolyte within the battery cell can reach −10° C. or higher within 120 seconds, which is shorter than 200 seconds, even though the heating temperature of the surface heating element, i.e. the temperature applied to the battery cell, is 20° C.

Referring to FIG. 5 to FIG. 7, the temperature of the electrolyte within the battery cell, which can increase within 200 seconds, is varied depending on the area of the heating portion of the surface heating element and the area of the heated portion of the battery cell. Accordingly, the heating temperature of the surface heating element, that is, the temperature applied to the battery cell, must be properly designed in consideration of the rising temperature of the electrolyte.

The invention claimed is:

1. A heating sheet for battery modules, comprising:
   a surface heating element, wherein the surface heating element comprises:
   a base film,
   a heating layer, wherein the heating layer comprises one selected from the group consisting of woven carbon fibers, non-woven fabric impregnated with carbon nanotubes (CNT) or graphene, and non-woven fabric impregnated with conductive carbon,
   an electrode layer, wherein the electrode layer comprises at least one selected from Ag and Cu, and a space between electrodes is range from 4 mm to 16 mm, and
   wherein the surface heating element comprises the base film, the heating layer and the electrode layer in this order;
   an insulating layer formed on one surface of the surface heating element, wherein the insulating layer comprises a film comprising at least one selected from the group consisting of biaxially-oriented polyethylene terephthalate (BOPET), oriented polystyrene (OPS), oriented polypropylene (OPP), polyether ether ketone (PEEK), polyethylene terephthalate glycol (PETG), and polyethyleneimide (PEI); and
   an insulating adhesive layer formed on the other surface of the surface heating element, wherein a first area of a heating portion of the surface heating element is 40% to 90% of an entire area of a battery cell to which the surface heating element is attached.

2. The heating sheet according to claim 1, wherein the first area of the heating portion of the surface heating element comprises a second area, a temperature of the second area is higher by 30° C. to 50° C. than an initial temperature of the surface heating element.

3. The heating sheet according to claim 1, wherein the surface heating element is configured to generate heat only in the first area of the heating portion of the surface heating element.

4. The heating sheet according to claim 1, wherein the surface heating element has a heating temperature of 20° C. to 80° C.

5. The heating sheet for battery modules according to claim 1, wherein the heating layer has a thickness of 2 μm to 10 μm.

6. The heating sheet for battery modules according to claim 1, wherein the insulating adhesive layer has a thickness of 25 μm to 75 μm.

7. The heating sheet for battery modules according to claim 1, wherein the insulating layer has a thickness of 50 μm to 100 μm.

8. The heating sheet according to claim 1, wherein the insulating adhesive layer comprises at least one selected from the group consisting of an acrylic compound, a silicon compound, and an ethylene vinylacetate (EVA) compounds.

9. A battery module comprising:
   the heating sheet for battery modules according to claim 1 and a battery cell.

10. The battery module according to claim 9, wherein the first area of the heated portion of the battery cell comprises a second area, a temperature of the second area is 30° C. to 50° C. higher than an initial temperature of the battery cell.

11. The battery module according to claim 9, wherein the heating sheet for battery modules is configured to increase a temperature of an electrolyte within the battery cell by 20° C. or higher within 200 seconds from a start of heating.

12. The battery module according to claim 9, wherein the battery cell has a surface temperature of 20° C. to 80° C.

13. The battery module according to claim 9, wherein the electrolyte within the battery cell has a temperature of −10° C. to 35° C.

14. The battery module according to claim 9, wherein the insulating adhesive layer comprises at least one selected from the group consisting of an acrylic compound, a silicon compound, and an ethylene vinylacetate (EVA) compounds.

* * * * *